United States Patent [19]
Fasching

[11] 3,992,672
[45] Nov. 16, 1976

[54] MULTIPLE CHANNEL COINCIDENCE DETECTOR AND CONTROLLER FOR MICROSEISMIC DATA ANALYSIS

[75] Inventor: George E. Fasching, Morgantown, W. Va.

[73] Assignee: The United States of America as represented by the United States Energy Research and Development Administration, Washington, D.C.

[22] Filed: Oct. 7, 1975

[21] Appl. No.: 620,460

[52] U.S. Cl. .......................... 328/110; 307/235 W; 328/117; 324/77 R
[51] Int. Cl.² .................................................. H04B 1/04
[58] Field of Search .................. 328/110, 117, 115; 324/77 R, 77 A; 340/15 AP, 15 AC; 307/235 W

[56] References Cited
UNITED STATES PATENTS

| | | | |
|---|---|---|---|
| 3,018,468 | 1/1962 | Jones et al. ...................... | 328/117 X |
| 3,532,977 | 10/1970 | Giordano et al. .................. | 324/77 R |
| 3,667,057 | 5/1972 | Pfersch, Jr. et al. ................ | 328/117 |
| 3,805,169 | 4/1974 | Hayakawa et al. ................. | 328/117 |

Primary Examiner—Stanley D. Miller, Jr.
Assistant Examiner—B. P. Davis
Attorney, Agent, or Firm—Dean E. Carlson; David S. Zachry; David E. Breeden

[57] ABSTRACT

A multiple channel coincidence detector circuit is provided for analyzing data either in real time or recorded data on a magnetic tape during an experiment for determining location and progression of fractures in an oil field or the like while water is being injected at high pressure in wells located in the field. The circuit is based upon the utilization of a set of parity generator trees combined with monostable multivibrators to detect the occurrence of two events at any pair of channel input terminals that are within a preselected time frame and have an amplitude above a preselected magnitude. The parity generators perform an exclusive OR function in a timing circuit composed of monostable multivibrators that serve to yield an output when two events are present in the preselected time frame. Any coincidences falling outside this time frame are considered either noise or not otherwise useful in the analysis of the recorded data. Input pulses of absolute magnitude below the low-level threshold setting of a bipolar low-level threshold detector are unwanted and therefore rejected. A control output is provided for a utilization device from a coincidence hold circuit that may be used to halt a tape search unit at the time of coincidence or perform other useful control functions.

5 Claims, 4 Drawing Figures

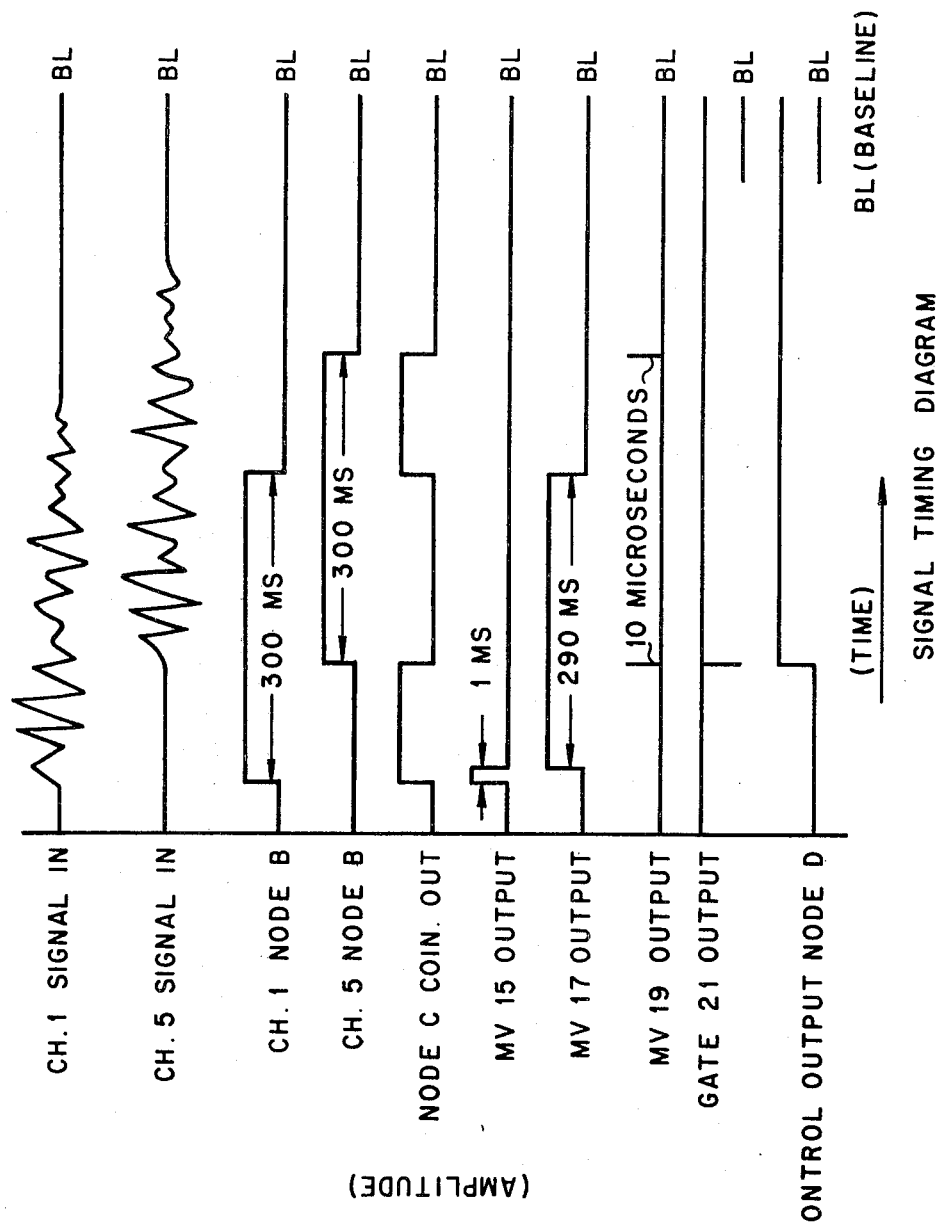

MULTIPLE CHANNEL COINCIDENCE DETECTOR AND CONTROLLER FOR MICROSEISMIC DATA ANALYSIS

BACKGROUND OF THE INVENTION

This invention relates generally to coincidence detection circuits and more particularly to a multichannel coincidence detector and controller for detecting coincidence of preselected amplitude pulses occurring within a preselected time frame.

In the analysis of multichannel data collected during fracturing of oil fields resulting from high-pressure water injection, it is necessary to map fracture propagation to obtain a knowledge of the induced fissure characteristics vital in the promotion of oil well production. To determine the location and progression of fractures in an oil field while water is being injected at high pressure into one well, passive acoustic sensors are placed in surrounding wells to listen for microseisms during fracturing tests. The analog outputs from the sensors are normally recorded on a magnetic tape for later data reduction. Considerable footage of recorded magnetic tape is collected during an injection experiment which must be edited and analyzed. The signals of interest occur infrequently and at random and may best be identified by coincidences occurring within a certain time frame over one or more channels.

It has been the practice in the art to play the analog data tapes back into a multichannel oscilloscope or high-speed strip chart recorder to locate coincidences. Neither method has been very reliable because of considerable time consumed requiring an operator to constantly view the oscilloscope or strip chart to locate coincidences. Further, the strip chart recorder uses an exorbitant amount of expensive recording paper. Thus, there is a need for a multiple channel device to increase speed and certainty of detecting coincidences of events in real time or during reproduction of recorded data to more reliably detect coincidences from multiple channel data recordings which is much faster and requires considerably less operator attention.

SUMMARY OF THE INVENTION

In view of the above need, it is a primary object of the present invention to provide a multiple channel coincidence detector and control circuit for detecting the coincidence of event pulses within a preselected time frame from a multiple channel input.

Another object of this invention is to provide a multiple channel coincidence detector as set forth in the above object which further includes means for indicating which channels are involved in the coincidence.

Yet another object of this invention is to provide a multiple channel coincidence detector as set forth in the above objects further including means for detecting coincidences of pulses from the multichannel input of either initial positive or negative polarity.

Another object of the present invention is to provide the multichannel coincidence detector as set forth in the above objects which may be altered to handle an unlimited number of input channels and adjusted for a wide range of threshold detection levels.

Other objects and many of the attendant advantages of the present invention will be obvious from the following detailed description taken in conjunction with the drawings.

BRIEF DESCRIPTION OF THE DRAWINGS

FIG. 4 is a signal timing diagram indicating the signals at various terminals of the block diagram shown in FIG. 1.

DETAILED DESCRIPTION

Figure 1:
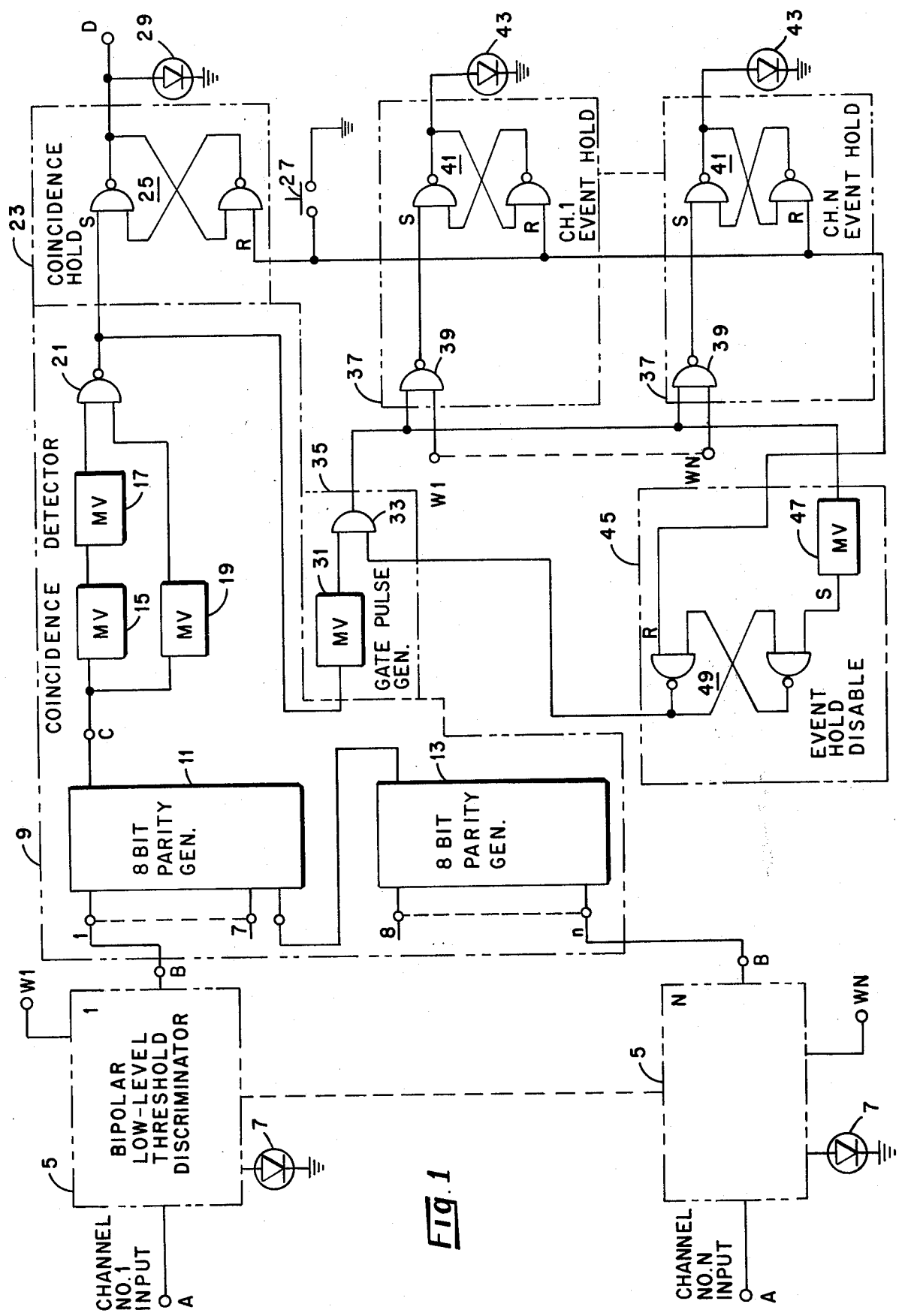
FIG. 1 is a schematic block diagram of a multiple channel coincidence detector according to the present invention.
Figure 3:
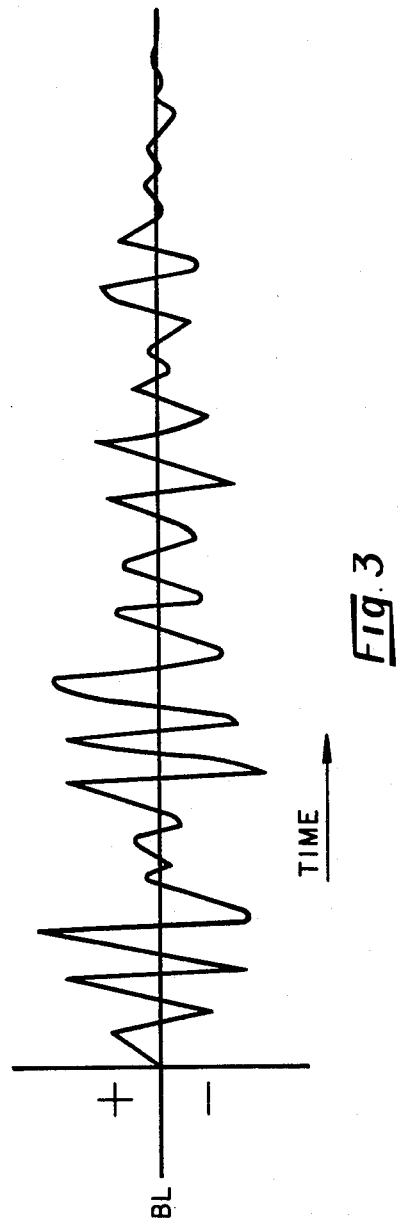
FIG. 3 is a graphic illustration of a typical seismic signal applied to a particular channel input A.

Referring now to FIG. 1 wherein there is shown a block diagram of a multiple channel coincidence detector according to the present invention, it will be seen that each channel receiving data is applied to a corresponding numbered channel input A numbered 1 through $n$. The terminal A receives the microseismic signal, as shown in FIG. 3, and applies the signal by connection to a corresponding channel numbered bipolar low-level threshold discriminator 5. Although the invention will be illustrated as applicable to multiple channel seismic data analysis for determining the coincidence of seismic events within a time frame of not more than 291 milliseconds and not less than 1 millisecond, it will be understood that the circuit is applicable to any process wherein it is necessary to determine the coincidence of pulses from multiple channel inputs within a selected time frame. The seismic signals for analysis are characterized by pulses that rise steeply, oscillate through the base line many times before settling. The oscillations occur because of the multipath transmission reflections that the acoustic wave endures in addition to resonant effects of the medium encountered. The received signals appear somewhat as shown in FIG. 3. In the data analysis only the first arrival (initial rise) is of importance. Since the initial rise may be either in the positive or negative going direction, the discriminators 5 contain circuitry to detect the initial rise in either polarity from the base line (BL).

Once the initial rise exceeds the threshold input level of the corresponding discriminator 5, an output signal is generated at the corresponding output terminal B. Further, each discriminator may be equipped with an event lamp 7 connected between the output of the discriminator and ground potential to indicate the particular channel from which the event is detected. The output terminals B of all the discriminators 5 are connected to corresponding separate inputs of a coincidence detector 9. Although as indicated above, the circuit may be modified for analyzing $n$ number of input data channels, it will be illustrated herein with an example of a 15-channel input system ($n = 15$). Thus, the coincidence detector has 15 inputs corresponding to 15 outputs from the same number of discriminators 5. Each discriminator output terminal B is connected to a respective input of one of two eight-bit parity generators 11 and 13. The eight-bit parity generator module is a commercially available integrated circuit component which performs an exclusive "OR" function on the inputs connected thereto. The parity generators are essentially connected in series by connecting the output of generator 13 to one channel input of generator 11. The generators 11 and 13 connected in this manner have the following response:

$$C = B_1 + B_2 + B_3 + \ldots + B_n$$

where + is the exclusive "OR" symbol, C is the output logic level and $B_1$, $B_2$, etc., are the input logic levels.

To complete the coincidence detector circuit 9, the output terminal C of the parity generator 11 is connected to the input of a monostable multivibrator 15. Multivibrator 15 generates a 1 millisecond pulse at its output in response to the positive going pulse at the output terminal C of the parity generator 11. The output of multivibrator 15 is connected to the input of a monostable multivibrator 17 which generates a 290 millisecond period pulse at its output beginning at the trailing edge of the 1 millisecond pulse from multivibrator 15. The 1 millisecond pulse combined with the 290 millisecond pulse provides the 291 millisecond window for coincidence. Another monostable multivibrator 19 is connected to the output of parity generator 11 and provides a short duration (typically 10 microseconds) pulse when the output of parity generator 11 goes low indicating the appearance of coincidence as will be described hereinbelow. The output of multivibrator 19 is connected along with the output of multivibrator 17 to separate inputs of a NAND gate 21. Thus, when the output of multivibrator 17 is high and the output of multivibrator 19 goes high, generating the 10 microsecond pulse, this pulse is transmitted through gate 21 as a negative going 10 microsecond pulse, indicating the detection of coincident pulses within the time frame.

The output of gate 21 is connected to the input of a coincidence hold circuit 23. The hold circuit 23 may consist of simply a conventional set/reset flip-flop generally indicated by reference numeral 25. The output of gate 21 is connected to the set (S) input of flip-flop 25 so that the negative going 10 microsecond pulse sets flip-flop 25 which remains set until reset by applying ground through a pushbutton switch 27 to the reset (R) input of flip-flop 25. The set output (D) of flip-flop 25 may be connected to ground through the light-emitting diode 29 which is turned "on" when flip-flop 25 is set, indicating the coincidence condition. Further, the output terminal D of flip-flop 25 may be connected to a utilization device, such as to stop a tape reader or trigger other control devices as necessary.

Returning again to the coincidence detector 9, the output of gate 21 is connected to the input of a monostable multivibrator 31. The output of multivibrator 31 is connected to one input of an AND gate 33. The multivibrator 31 and AND gate 33 combine to form a gate pulse generator 35. The output of gate pulse generator 35 is connected to one of a pair of gated inputs of a plurality of event-hold circuits 37. The number of event-hold circuits 37 is equal to the number of input channels. The output terminals W-1 through W-N of the respective discriminators 5 are connected to one input of a NAND gate 39, each of which has a second input thereto connected to the output of gate pulse generator 35. Thus, events occurring within the time frame, the period that the gate pulse generator is enabled, are passed through a NAND gate 39 of the respective event-hold circuit 37. The output of each NAND gate 39 is connected to the respective set input of conventional set/reset flip-flops 41. Each of the flip-flops 41 has its reset input connected to pushbutton switch 27 so that each will be reset when the reset pushbutton 27 is activated. To indicate the channel number from which the events are detected, the set outputs of flip-flop 41 are connected through corresponding light-emitting diodes 43 to ground. The activated event-hold circuits for the particular activated channels remain set, therefore the corresponding lamps 43 remain "on" until reset.

To prevent the detection of events beyond 300 milliseconds after coincidence, an event-hold disable circuit 45 is provided which receives the output of the gate pulse generator circuit 35 at the input of a monostable multivibrator 47. The output of multivibrator 47 is connected to the set input of a conventional set/reset flip-flop 49 which has its reset output connected to one input of AND gate 33 in the gate pulse generator 35. By setting flip-flop 49 at the end of the 300 millisecond time period, gate 33 is disabled until the circuit is reset by activating pushbutton 27 which is connected to the reset input of flip-flop 49.

Figure 2:
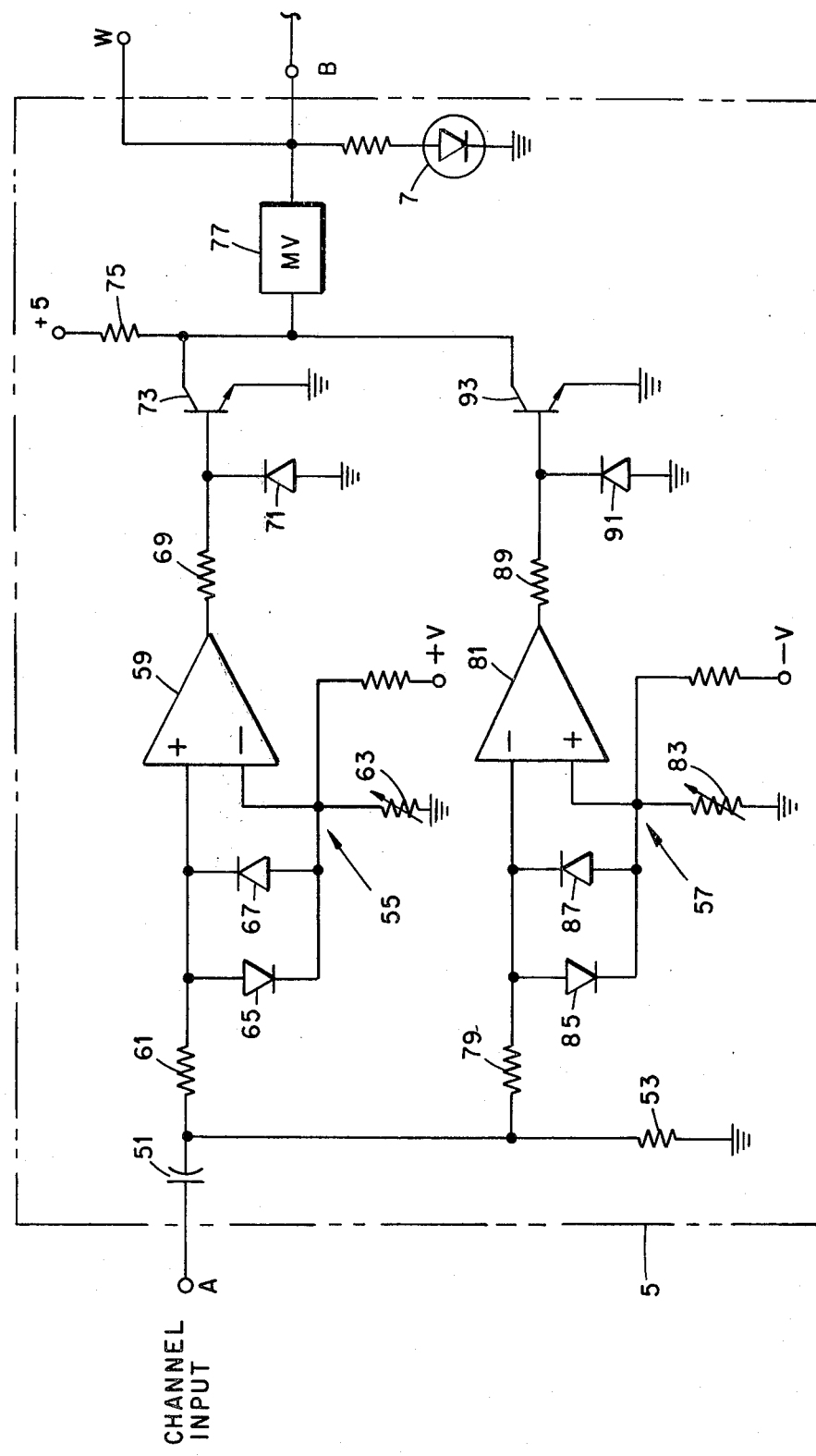
FIG. 2 is a schematic diagram of one of the bipolar low-level threshold discriminators shown in block form in FIG. 1.

In operation, the data channels to be analyzed for coincident pulses are connected to the A input terminals of the respective discriminators 5. As pointed out above, and referring to the signal as shown in FIG. 3, only the first arrival (initial rise) of the seismic signal is of importance. Therefore, filtering is provided to remove base line noise and DC offset level. Undesirable small, but significant amounts of 60 Hz and 120 Hz may enter the system. Referring to FIG. 2 wherein there is shown a schematic diagram of the threshold discriminator 5, it will be seen that the input is filtered by means of a capacitor 51 connected in series with the input lead and a resistor 53 connected between the inboard side of capacitor 51 and ground potential. The filter is employed to remove the offset and to a lesser extent 60 Hz and harmonics. The discriminator detects the initial portion of the event going either in a positive or negative direction. A pair of discriminator circuits 55 and 57 are provided to form low positive and negative thresholds, respectively, which may be adjusted by means of a variable resistor. In order to sense the first arrival of a positive going pulse an operational amplifier 39 is connected with the non-inverting input to the inboard side of capacitor 51 through a resistor 61. The inverting input of amplifier 59 is connected to a biasing network including an adjustable resistor 63 which allows for setting the reference threshold level for triggering amplifier 59. A pair of diodes 65 and 67 are reversed parallel connected across the inputs of amplifier 59 to protect the amplifier input from overvoltage. The output of amplifier 59 is connected through a resistor 69 to the cathode of a diode 71 which has its anode connected to ground. Thus, when the input level at terminal A is less positive than the reference voltage applied to the inverting input of amplifier 59, the output of amplifier 59 is negative and the diode 71 conducts to ground. However, when the input level exceeds the reference level the output of amplifier 59 swings positive, thereby reverse biasing diode 71. This positive level is sensed by a switching circuit including a transistor 73 having its base connected to the cathode of diode 71. The collector of transistor 73 is connected to a positive voltage supply through a load resistor 75. The emitter of transistor 73 is connected to ground. Thus, when transistor 73 conducts, due to the positive swing at the output of amplifier 59, the collector of transistor 73 essentially drops to ground potential, thereby triggering a monostable 77 multivibrator having its input connected to the collector of transistor 73. The output of multivibrator 77 is the terminal B output of the particular channel discriminator 5. The event lamp 7, which may be a light-emitting diode as shown in FIG. 2, is connected between the output of multivibrator 77 and ground potential. Further, as shown in FIG. 1, the output terminal W triggers the corresponding event-hold circuit when multivibrator 77 is activated.

In order to trigger the multivibrator 77 when the event initially is a negative going signal, the signal from terminal A is applied through a resistor 79 to the inverting input of an operational amplifier 81. The non-inverting input is connected to a biasing circuit including an adjustable resistor 83 which adjusts the negative threshold level applied to the non-inverting input of amplifier 81. As in the positive channel described above, the input is shunted by parallel reverse connected diodes 85 and 87. The output of amplifier 81 is connected through a resistor 89 to the cathode of a diode 91 which has its anode connected to ground. As in the above case, the output of amplifier 81 is negative until the input signal becomes more negative than the reference threshold level then the output of amplifier 81 swings positive. The positive swing is sensed by connecting transistor 93 with its base to cathode of diode 91. The collector is connected to the input of multivibrator 77 and the emitter is connected to ground. Thus, when the output of amplifier 81 swings positive, transistor 93 will be switched "on" causing the voltage at the input of multivibrator 77 to swing to ground potential, thereby triggering multivibrator 77. This produces an output at terminal B as in the above case for a positive initial signal voltage. Thus, it will be seen that this yields an OR'ed input function that triggers monostable multivibrator 77 for either an initial positive or negative going input at terminal A exceeding the particular threshold setting.

The outputs of all input discriminators 5 are coupled to a pair of parity generators 11 and 13 which perform an exclusive "OR" function as pointed out above. Each multivibrator 77 of the $n$ input discriminators is timed to provide a 300 millisecond positive pulse output when triggered. If only 1 multivibrator is triggered, the parity generator output terminal C will go high for 300 milliseconds and then fall at the end of this period with the input pulse. If, however, a second input exceeds the threshold level in another multivibrator 77 and one of the other channels is triggered within the 300 millisecond intervals during which the first is still high, then the output C or parity generator 11 will go low.

When the output of parity generator 11 goes high initially, it triggers multivibrator 15 which is adjusted to generate a 1 millisecond pulse, as shown in the timing diagram of FIG. 4. After this period, it triggers multivibrator 17 on the trailing edge of the 1 millisecond pulse from multivibrator 15. Multivibrator 17 is set to provide a logic 1 (high level) pulse to enable gate 21 for 290 milliseconds. If during the 290 millisecond period the output C of parity generator 11 falls to a logic 0 because of a second event occurring at some other channel, then multivibrator 19 will be triggered on the trailing edge of the output from parity generator 11. Multivibrator 19 is timed to generate a short logic 1 pulse of 10 microseconds. If it occurs while multivibrator 17 is "on", then NAND gate 21 output will become a logic 0. During this transition, flip-flop 25 in the coincidence hold circuit 23 will be set and the lamp 29 will come "on" indicating coincident events. Further, the output D is activated which may be used as described above to perform various functions in a number of utilization devices. The lamp 29 will remain "on" until reset by means of the manual pushbutton reset switch 27.

The coincidence hold circuit 23 is only set if multivibrator 19 is triggered while the output of multivibrator 17 is high. The timing for this operation is shown in FIG. 4. It will be seen that the time window for an output pulse to occur at gate 21 is 290 milliseconds long and begins at 1 millisecond after the occurrence of the first event at any channel that triggers one of the input channel discriminators 5 when no other discriminator channel for the remaining channels is "on". This causes the coincidence detector output at terminal C to rise to a logic 1 triggering multivibrator 15 and after 1 millisecond multivibrator 15 triggers multivibrator 17. Multivibrator 17 generates the window pulse that enables NAND gate 21. If a second event occurs while the window exists, then terminal C at the output of parity generator drops to the logic 0, triggering multivibrator 19 which generates the short 10 microsecond pulse. Since gate 21 is enabled, this pulse is transmitted after conversion to the coincidence hold circuit 23, setting flip-flop 25. Assuming that flip-flop 25 has been reset, this pulse will set the hold circuit flip-flop 25, indicating coincidence has occurred.

Once set, the coincidence hold flip-flop 25 will remain set until manually reset with the pushbutton 27. The coincidence hold circuit provides the logic level control output at D that becomes high when the hold circuit is set and is returned to logic 0 when pushbutton 27 is depressed. The output of gate 21 is also used to trigger the gate pulse generator 35 by setting multivibrator 31. When multivibrator 31 is triggered, it develops a pulse of 300 milliseconds that enables all input gates 39 of the channel event-hold circuits 37. If an event occurs in any of the channels during the 300 milliseconds, the corresponding discriminator 5 output (W-1 through W-N) is gated through the gate 39 of the corresponding channel event-hold circuit, thereby transmitting the event pulse to the respective event-hold circuit flip-flop 41. When an event-hold flip-flop 41 is set, its corresponding channel coincidence lamp 43 is turned "on" and remains "on" until flip-flop 41 is reset through operation of the pushbutton switch 27. When an event-hold circuit 37 is set due to an event occurring in that channel within the 300 milliseconds enable pulse from multivibrator 31, the respective light-emitting diode 43 is turned "on" and is extinguished only by manual resetting with the pushbutton switch 27. In order to prevent later occurring events from being registered and displayed by its respective event-hold circuit 37 and LED 43, the event-hold disable circuit 45 is set to prevent passage of pulses through gate 33 of the gate pulse generator 35. The trailing edge of the 300 millisecond pulse from multivibrator 31 triggers multivibrator 47, thereby setting flip-flop 49 of the event-hold-disable circuit 45. This causes one input of gate 33 to fall to logic 0, thereby disabling the gate. Flip-flop 49 may only be restored to the reset state by reset pushbutton 27. The result is that when a coincidence occurs the coincidence lamp 29 is turned "on" and all events that follow within the 300 milliseconds of coincidence will be stored and held in its respective channel event-hold circuit 37. The respective lamps 43 will also be illuminated.

When searching a 14-track magnetic data tape that has a time code recording on one of the tracks, a tape search unit decodes the recorded time and also displays the time. The control signal at D may be utilized to freeze the time displayed at the instance of coincidence by the tape search unit. By this means, the exact time of coincidence as well as the channels in which the coincidence existed is displayed along with the time from the search unit. Having this information considerably simplifies further analyses and processing of the data on tape. The control signal at signal D may be used to alert the operator with an audible signalling device, such as a buzzer, bell, etc., when a coincidence is located.

Thus, it will be seen that a coincidence detecting system which detects coincidence of events from multiple channels within a selected time frame has been provided which may be set to automatically signal an operator of the occurrence of coincidence and may be used with equipment to automatically record coincidence of events along with the exact time of occurrence without constant operator attention.

It will be obvious to those skilled in the art that various modifications and changes may be made in the described embodiment without departing from the spirit and scope of the invention as set forth in the following claims attached to and forming a part of this specification.

What is claimed is:

1. A multiple channel coincidence detector for determining the occurrence of at least two events in the form of electrical signals within a preselected time frame in separate channels from a multiple channel input source, comprising:
 a plurality of discriminator means equal in number to the number of channels of said input source for generating an output pulse at a corresponding channel discriminator output upon detection of an event whose magnitude exceeds a preselected threshold level;
 a coincidence detector including circuit means having a plurality of inputs connected to respective ones of said plurality of discriminators for providing an exclusive "OR" function at an output thereof of said plurality of said inputs, a first monostable multivibrator connected to the output of said circuit means and generating an output pulse for a first selected period following the detection of an initial event, a second monostable multivibrator connected to the output of said first multivibrator and generating an output pulse for a second selected period equal to said preselected time frame following the period of said pulse from said first multivibrator, a third monostable multivibrator connected to the output of said circuit means and generating a pulse at the output thereof upon the detection of an event following said initial event, and gating means for gating a pulse at the output of said third multivibrator to an output of said gating means during said preselected time frame; and
 a plurality of event-hold circuit means equal in number to said plurality of channels, each event-hold circuit means having an input connected to respective outputs of said plurality of discriminators and each responsive to the output of said gating means of said coincidence detector for indicating and storing the respective channel locations of said at least two events occurring within said preselected time frame.

2. The multiple channel coincidence detector as set forth in claim 1 wherein each of said plurality of event-hold circuit means includes a flip-flop having set and reset inputs and a set output, a gating means having first and second inputs and an output connected to said set input of said flip-flop for gating a signal to set said flip-flop when both inputs to said gating means is activated, said first input of said gating means being coupled to the output of said coincidence detector and said second input of said gating means being connected to the respective channel discriminator output, and indicator means connected to the set output of said flip-flop for indicating the detection of an event in the corresponding channel.

3. The multiple channel coincidence detector as set forth in claim 2 further including a reset means connected to said reset input of said flip-flop of each of said plurality of event-hold circuit means for manually resetting said flip-flops following the detection of coincident events.

4. The multiple channel coincidence detector as set forth in claim 3 further including means responsive to the output of said coincidence detector for disabling said gating means of each of said plurality of event-hold circuit means following the detection of said at least two events within said time frame.

5. The multiple channel coincidence detector as set forth in claim 4 wherein each of said plurality of discriminator means includes a bipolar threshold discriminator.

* * * * *